United States Patent
Frenkel et al.

(10) Patent No.: US 6,652,639 B1
(45) Date of Patent: Nov. 25, 2003

(54) INK ADDITIVES

(75) Inventors: Moshe Frenkel, Jerusalem (IL); Eitan Cohen, Herzlia (IL)

(73) Assignee: Idanit Technologies Ltd., Rishon Lezylon (IL)

( * ) Notice: Subject to any disclaimer, the term of this patent is extended or adjusted under 35 U.S.C. 154(b) by 0 days.

(21) Appl. No.: 09/403,245

(22) PCT Filed: Apr. 15, 1998

(86) PCT No.: PCT/IL98/00182

§ 371 (c)(1),
(2), (4) Date: Mar. 13, 2000

(87) PCT Pub. No.: WO98/47972

PCT Pub. Date: Oct. 29, 1998

(30) Foreign Application Priority Data

Apr. 18, 1997 (IL) .................................................. 120698

(51) Int. Cl.⁷ ............................................... C09D 11/02
(52) U.S. Cl. ................................ 106/31.89; 106/31.75; 106/31.86
(58) Field of Search ........................... 106/31.89, 31.75, 106/31.86

(56) References Cited

U.S. PATENT DOCUMENTS

| | | |
|---|---|---|
| 5,102,458 A | 4/1992 | Lent et al. |
| 5,106,416 A | 4/1992 | Moffatt et al. |
| 5,106,417 A | 4/1992 | Hauser et al. |
| 5,169,437 A | 12/1992 | You ........................ 106/31.58 |
| 5,209,998 A | 5/1993 | Kavassalis et al. |
| 5,431,720 A | 7/1995 | Nagai et al. |
| 5,462,592 A | 10/1995 | Murakami et al. ........ 106/31.43 |
| 5,494,759 A | 2/1996 | Williams et al. |
| 5,679,724 A * | 10/1997 | Sacripante et al. ......... 523/161 |
| 5,891,232 A * | 4/1999 | Moffatt et al. ........... 106/31.89 |
| 6,036,759 A * | 3/2000 | Wickramanayake et al. ..... 106/31.28 |

FOREIGN PATENT DOCUMENTS

EP     0 272 896     6/1988

* cited by examiner

Primary Examiner—Mark L. Bell
Assistant Examiner—Veronica F. Faison
(74) Attorney, Agent, or Firm—Kenyon & Kenyon

(57) ABSTRACT

An additive for a pigment based ink—jet printing composition which is used in conjunction with a printing head that comprises metallic components, is disclosed. The additive comprises a cationic component and an anionic component, and characterized in that the cationic component is a cationic surfactant. Preferred additives are those where the cationic component is $C_{10-22}$ alkyl trimethyl ammonium. Pigment-based ink—jet printing compositions comprising these additive are also described.

6 Claims, 1 Drawing Sheet

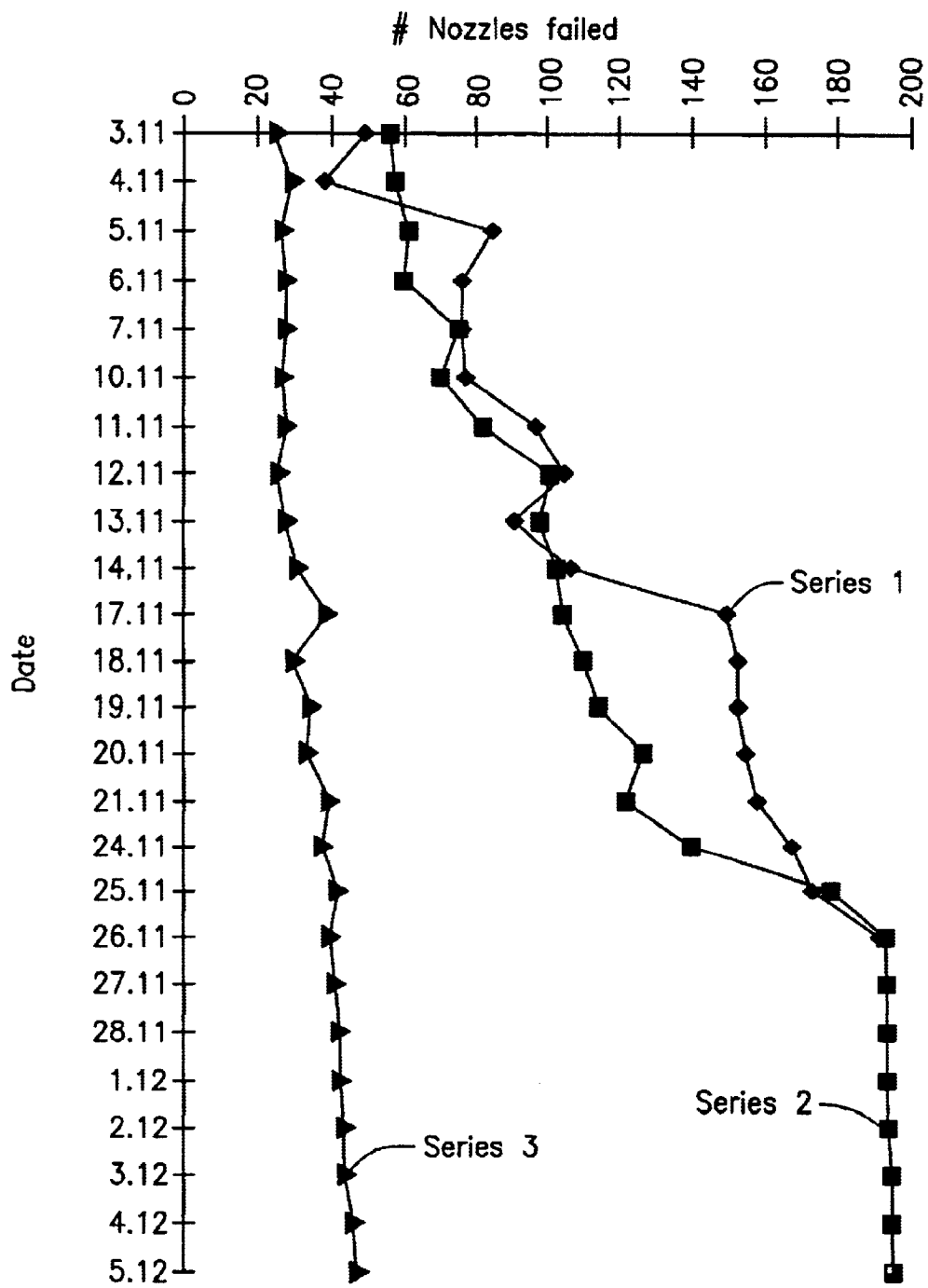

INK ADDITIVES

FIELD OF THE INVENTION

The present invention relates to ink jet printing formulations and specifically it concerns pigment-based ink jet printing formulations that contain anti clogging agents.

BACKGROUND OF THE INVENTION

Ink jet printing is a well-known technique by which printing is done without establishing actual contact between the printing device and the substrate on which the printed matter is deposited. One such method comprises projecting a stream of droplets towards a surface, where the trajectories of the droplets are controlled electronically, thus obtaining the desired printed image. Another method of ink jet printing is to direct droplets on demand from a set of orifices onto a substrate which moves relatively to the set of orifices.

The ink compositions used in these devices, must meet various requirements concerning viscosity, surface tension, resistivity, solubility, wetability of the substrate, rapid drying and that they may pass through an ink jet orifice without crusting or clogging it. It should be understood that crusting and clogging these orifices is unacceptable because it reduces print quality by leaving a white, non-printed area on the substrate and ultimately leads to failure of the printer to print. When using pigments-based inks in ink-jet printers, clogging was found to be an extremely severe problem due to extensive clogging caused by pigment aggregation.

In the past, a number of solutions suggesting ways to improve ink jet printing formulations, have been described.

U.S. Pat. No. 5,431,720 discloses a quick-drying ink composition which has good penetrating property and preservation stability, and comprises water, a lubricant, a coloring agent and R—O($CH_2CH_2O$)$_m$$CH_2$COOM, where R is an alkyl group having 6 to 14 carbon atoms; M is a cation selected from among alkali metal ion, quaternary ammonium cation, quaternary phosphonium cation, alkanol amine cation, and m is an integer of 3 to 12.

U.S. Pat. No. 5,102,458 discloses the incorporation of a $C_{2-4}$ alkyl amine into a non-aqueous, ink jet printing formulations so as to inhibit corrosion of metals which come into contact with the ink formulation U.S. Pat. No. 5,106,417 teaches the use of an ink composition having improved viscosity, where this composition comprises a solid pigment based on a polyacrylic resin, water dilutable organic solvent such as $C_1$–$C_4$-alkanols, lower aliphatic ketones and others, water and a humectant such as ethyleneglycol diethylene glycol triethylene glycol and the like.

U.S. Pat. No. 5,494,759 discloses an ink jet printing formulation which comprises a support and an ink receiving layer containing a pigment, a hydrophilic binder comprising a mixture of polyvinyl alcohol, polyvinylpyrrolidone and a vinyl acetate homopolymer and/or vinyl acetate alkyl acrylate copolymer, together with a quaternary ammonium compound. This composition, according to U.S. Pat. No. 5,494,759 assures a good waterfastness and web rub off properties, as well as high color density and image clarity.

A water soluble dye ink composition comprising an anionic dye component and a cationic dye counter ion, where the cationic dye counter ion is selected from among lithium, a quaternary ammonium ad a quaternary phosphonium, is disclosed in U.S. Pat. No. 5,462,592.

U.S. Pat. No. 5,169,437 discloses a possible solution to the problem of crusting and clogging of the orifices by employing a humectant in the aqueous ink-jet compositions. In accordance with this reference, including compounds such as ethylene glycol, propylene glycol, trimethylol propane, pentaethylene glycol, improves the ink composition by reducing the rate of evaporation.

SUMMARY OF THE INVENTION

It is therefore the object of the present invention to provide an additive for a pigment-based ink-jet printing composition, capable of substantially reducing clogging in a printing head of an ink-jet printer.

It is a further object of the present invention to provide a pigment-based ink-jet printing composition comprising an additive which is capable of substantially reducing clogging in the printing head and corrosion of metal parts of the ink jet printing apparatus with which the printing ink composition comes into contact.

Other objects of the invention will become apparent as the description proceeds.

The present invention concerns an additive for a pigment based ink-jet printing composition which is used in conjunction with a printing head that comprises metallic components, said additive comprising a cationic component and an anionic component, characterized in that the cationic component is a cationic surfactant The term "surfactant" as used hereinafter relates to a substance that, when present at low concentration in a system has a property of adsorbing onto surfaces or interfaces of the system and of altering to a marked degree the surface or interfacial fee energies of those surfaces or interfaces.

Ink-jet printing compositions which include pigment(s) therein, are in fact dispersions of pigments, where the pigment particles demonstrate a tendency to aggregate, thus clogging the ink jet orifices of the printers print head. The purpose of the present invention is to provide an additive that when added to an ordinary pigment-based ink-jet printing composition, will retain the ink's properties while preventing the aggregation of the pigment's particles in the ink when subjected to interaction with the print head metallic side walls. This effect is achieved by adsorption of the long chain of the cationic surfactant to the pigments' surface, thus providing it with extra stability which overcomes and prevents the pigment coalescence, aggregation and consequently the clogging of the nozzles while the pigments interact with the printing head metallic side walls.

According to a preferred embodiment of the invention, the cationic component of the additive is an ammonium surfactant, preferably, $C_{10-22}$alkyl trimethyl ammonium.

According to another preferred embodiment of the invention, the anionic component of the additive is bromide, chloride and the like.

According to yet another preferred embodiment of the invention, the additive is $C_{16}(CH_3)_3$NBr.

According to another aspect of the invention there is provided a pigment-based ink-jet printing composition comprising the additive of the invention as described above.

According to a further preferred embodiment of the invention there is provided a pigment-based ink-jet printing composition, in which the additive of the invention comprises about 0.05 to about 1% by weight of the total composition weight, preferably from about to 0.2 to about 0.4% by weight.

BRIEF DESCRIPTION OF THE DRAWING

FIG. 1 demonstrates the results obtained in a comparison test conducted to evaluate the performance of the additive of the present invention.

EXAMPLES

Example 1

Three pigment-based jet-inks were compared by passing each through four printing heads, where each one of the heads comprised 48 nozzles. The details of printing heads used, are to be found in our co-pending application IL 119944, which is hereby incorporated by reference. The first jet-ink was a standard solvent based magenta pigmented ink supplied by Marabu, Germany, which was also used as a basis for the other two inks (to be referred to hereinafter as "ink no. 1"). The second ink tested was a modification of said ink no. 1, wherein 0.2% by weight of an anionic surfactant of the type of primary ester of phosphoric acid (mono-tetradecyl phosphate salt) was added to ink no. 1, and the third ink tested was a composition comprising ink no. 1, to which 0.3% by weight of $C_{16}(CH_3)_3NBr$ was added. The additives were mixed with the ink up to complete dissolution, prior to their use. All heads operated throughout the test under identical conditions. The number of non-operating nozzles was recorded as a function of time, and when the experiment was concluded, it was verified that all the nozzles which did not operate, could be operative again once the clogging has been removed.

FIG. 1 presents the results obtained after one month of operation. In the performance evaluation, heads which had already been in use, were tested. Therefore, some nozzles were already clogged when the test started, hence the graphs presenting the number of clogged nozzles do not start from zero nozzles failed. It may clearly be seen from the Figure, that all the nozzles through which ink of the first and second types were jetted, were clogged within 23 days of operation, while at that time only about 8% of the nozzles through which ink of the third type was jetted, were clogged

Example 2

A printing head type Idanit Ad162 was immersed in 6 types of pigment-based jet-inks. The first three being those described under Example 1, whereas the other three were yellow pigment based ink, cyan pigment based ink and black pigment based ink.

It was found that when immersed in each of these inks, with the exception of ink no. 3 which comprised 0.3% by weight of $C_{16}(CH_3)_3NBr$ additive, the heads exhibited severe pitting and corrosion of the metallic parts of the printing head which were in direct contact with the ink. At the same time large ink aggregates (in the order of 100 to 500 accumulate on the inner side walls of the printing heads after 5 days from the start of the test.

When the head which was immersed in ink no. 1 to which 0.3% by weight of $C_{16}(CH_3)_3NBr$ was added, was examined after 21 days, none of the above described phenomena were observed

What is claimed is:

1. A method for substantially reducing clogging and pitting in an ink-jet print head, the method comprising:
   adding an ink additive to an ink comprising a non-aqueous primary solvent and a plurality of pigment particles, wherein the ink additive comprises a cationic component and an anionic component, the cationic component comprising a cationic surfactant; and
   passing the ink with the ink additive through the ink-jet print head, wherein aggregation of the plurality of pigment particles is substantially reduced and pitting of the ink-jet print head is substantially reduced.

2. The method according to claim 1, wherein the cationic component comprises an alkyl ammonium surfactant.

3. The method according to claim 2, wherein the cationic component comprises $C_{10-22}$ alkyl trimethyl ammonium.

4. The method according to claim 1, wherein the cationic surfactant comprises $C_{16}H_{33}(CH_3)_3NBr$.

5. The method according to claim 1, wherein the ink additive constitutes from about 0.05% to about 1% by weight of the ink.

6. The method according to claim 5, wherein the ink additive constitutes from about 0.2% to about 0.4% by weight of the ink.

* * * * *

UNITED STATES PATENT AND TRADEMARK OFFICE
CERTIFICATE OF CORRECTION

PATENT NO. : 6,652,639 B1
DATED : November 25, 2003
INVENTOR(S) : Frenkel et al.

It is certified that error appears in the above-identified patent and that said Letters Patent is hereby corrected as shown below:

Column 1,
Line 44, change "formulation" to -- formulation. --
Line 64, change "ad" to -- and --

Column 2,
Line 29, change "fee energies" to -- free energies --
Line 34, change "printers" to -- printer's --

Column 3,
Line 35, change "clogged" to -- clogged. --

Column 4,
Line 14, change "observed" to -- observed. --

Signed and Sealed this

Third Day of August, 2004

JON W. DUDAS
*Acting Director of the United States Patent and Trademark Office*